United States Patent
Bera

(10) Patent No.: US 6,578,196 B1
(45) Date of Patent: Jun. 10, 2003

(54) CHECKING OF UNITS AND DIMENSIONAL HOMOGENEITY OF EXPRESSIONS IN COMPUTER PROGRAMS

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 09/589,394

(22) Filed: Jun. 7, 2000

(51) Int. Cl.⁷ .................................................. G06F 9/45
(52) U.S. Cl. ...................... 717/141; 717/143; 717/126
(58) Field of Search .................... 717/141–143, 717/114, 126; 704/1–10

(56) References Cited

U.S. PATENT DOCUMENTS

| | | | |
|---|---|---|---|
| 5,159,552 A | * 10/1992 | van Gasteren et al. | 704/1 |
| 5,216,627 A | * 6/1993 | McClellan et al. | 708/100 |
| 5,274,812 A | * 12/1993 | Inoue | 717/141 |
| 5,905,892 A | 5/1999 | Nielsen et al. | |
| 6,009,267 A | * 12/1999 | Ogawa | 717/101 |
| 6,237,139 B1 | * 5/2001 | Hotta et al. | 717/126 |

OTHER PUBLICATIONS

Cmelik et al. Dimensional Analysis with C++. IEEE. 1998. pp. 21–27.*

Novak. Conversion of Units of Measurement. IEEE. 1995. pp. 651–661.*

* cited by examiner

Primary Examiner—Gregory Morse
Assistant Examiner—Wei Zhen
(74) Attorney, Agent, or Firm—T. Rao Coca

(57) ABSTRACT

A method and apparatus is described for the checking of the correctness and consistency of units and dimensions of variables and constants used in expressions, such as those used in computer programs. The present invention relates to a method (200) and apparatus (100) for performing such checking. A set of user-supplied precompiler directives is added to the computer program that is to be checked. Broadly, functions, function parameters, constants and variables are replaced with strings from the precompiler directives. The resulting expressions are reduced into a standard form. The expressions in the reduced form are tested for homogeneity according to a set of predetermined conditions.

9 Claims, 3 Drawing Sheets

CHECKING OF UNITS AND DIMENSIONAL HOMOGENEITY OF EXPRESSIONS IN COMPUTER PROGRAMS

TECHNICAL FIELD OF THE INVENTION

The present invention relates to the checking of units and dimensional homogeneity of expressions, and in particular to checking of the correctness and consistency of units and dimensions of variables and constants used in expressions, such as those used in computer programs. The present invention relates particularly to a method and apparatus for performing such checking.

BACKGROUND ART

Algebraic expressions are typically used in computer programs to assign values to variables. These algebraic expressions may include operations with various measurement units and dimensions. Examples of such units and dimensions include meters, seconds, cubic meters, inches, kilograms, meters per second, and many more.

Prior methods of software testing of computer programs do not check for correctness and consistency of units and dimensions of variables and constants used in expressions. A failure to correctly do so may lead to serious miscalculations. A simple example of this would be if an algebraic expression containing a variable or constant having units of metres per second is added to another variable or constant with units of centimetres per second or inches per second.

According to the article "NASA Reworks its Sums after Mars Fiasco" by Reichhardt, T., published in Nature, Vol. 401, Oct. 7, 1999, p. 517, the loss of NASA's Mars Climate Orbitor on Sep. 23, 1999, as it was about to enter orbit, has been attributed to a confusion between imperial and metric units.

DISCLOSURE OF THE INVENTION

It is an object of the present invention to provide a method of checking units and dimensional homogeneity of expressions.

According to a first aspect of the invention, there is provided a method of checking a computer program for unit or dimensional homogeneity, the computer program including expressions, and the method comprising the steps of:

accepting as input corresponding strings for variables used in the expressions;

identifying and substituting instances of the variables with the corresponding strings;

recasting the expressions into a form of one or more token pairs arranged sequentially in a string, each said token pair comprising an operator followed by an operand;

reducing the strings in accordance with a set of predetermined simplifying rules; and checking the reduced strings for unit or dimensional homogeneity in accordance with a set of predetermined conditions.

The computer program may include assignment statements where the right hand sides of the assignment statements constitute expressions.

The computer program may also include functions, in which case the method comprises the further steps of checking for unit or dimensional homogeneity of the functions by:

accepting as input corresponding strings for the functions and function parameters used in the expressions;

creating an assignment statement for each of the function parameters;

identifying and substituting instances of variables on right hand side of the assignment statements with the corresponding strings;

substituting the function parameters with the corresponding strings;

recasting sides of the assignment statements into the form of one or more token pairs arranged sequentially in a string;

reducing the strings in accordance with the set of predetermined simplifying rules; and checking the reduced strings for unit or dimensional homogeneity in accordance with the set of predetermined conditions.

Preferably, the simplifying rules comprise performing the steps of:

arranging token pairs into subgroups;

arranging operand tokens in an arranged subgroup in order;

reducing the ordered operands by consolidating one or more constants and eliminating variables of opposite effect to form reduced subgroups; and consolidating one or more multiple instances of similar subgroups, to produce a reduced string.

Preferably, the set of predetermined conditions for expressions comprise performing the step of:

testing whether the reduced string reduces to a single term; or testing whether the reduced string reduces to the zero string.

The set of predetermined conditions for assignment statements preferably comprise performing the steps of:

testing whether the reduced string reduces to a single term; or testing whether the reduced string reduces to the zero string; and testing by comparison whether the sides of the assignment statements have corresponding unit-groups.

According to a further aspect of the invention, there is provided an apparatus for checking a computer program for unit or dimensional homogeneity, the computer program including expressions, the apparatus comprising:

means for accepting as input corresponding strings for variables used in the expressions;

means for identifying and substituting instances of the variables with the corresponding strings;

means for recasting the expressions into a form of one or more token pairs arranged sequentially in a string, each said token pair comprising an operator followed by an operand;

means for reducing the strings in accordance with a set of predetermined simplifying rules; and means for checking the reduced strings for unit or dimensional homogeneity in accordance with a set of predetermined conditions.

When the computer program includes functions, the apparatus comprising an additional means for checking for unit or dimensional homogeneity of the functions, this additional means comprising:

means for accepting as input corresponding strings for the functions and function parameters used in the expressions;

means for creating an assignment statement for each of the function parameters;

means for identifying and substituting instances of variables on right hand side of the assignment statements with the corresponding strings;

means for substituting the function parameters with the corresponding strings;

means for recasting sides of the assignment statements into the form of one or more token pairs arranged sequentially in a string;

means for reducing the strings in accordance with the set of predetermined simplifying rules; and means for checking the reduced strings for unit or dimensional homogeneity in accordance with the set of predetermined conditions.

BRIEF DESCRIPTION OF THE DRAWINGS

A preferred embodiment of the present invention will now be described with reference to the drawings in which.

DETAILED DESCRIPTION INCLUDING BEST MODE

Apparatus

Figure 1:
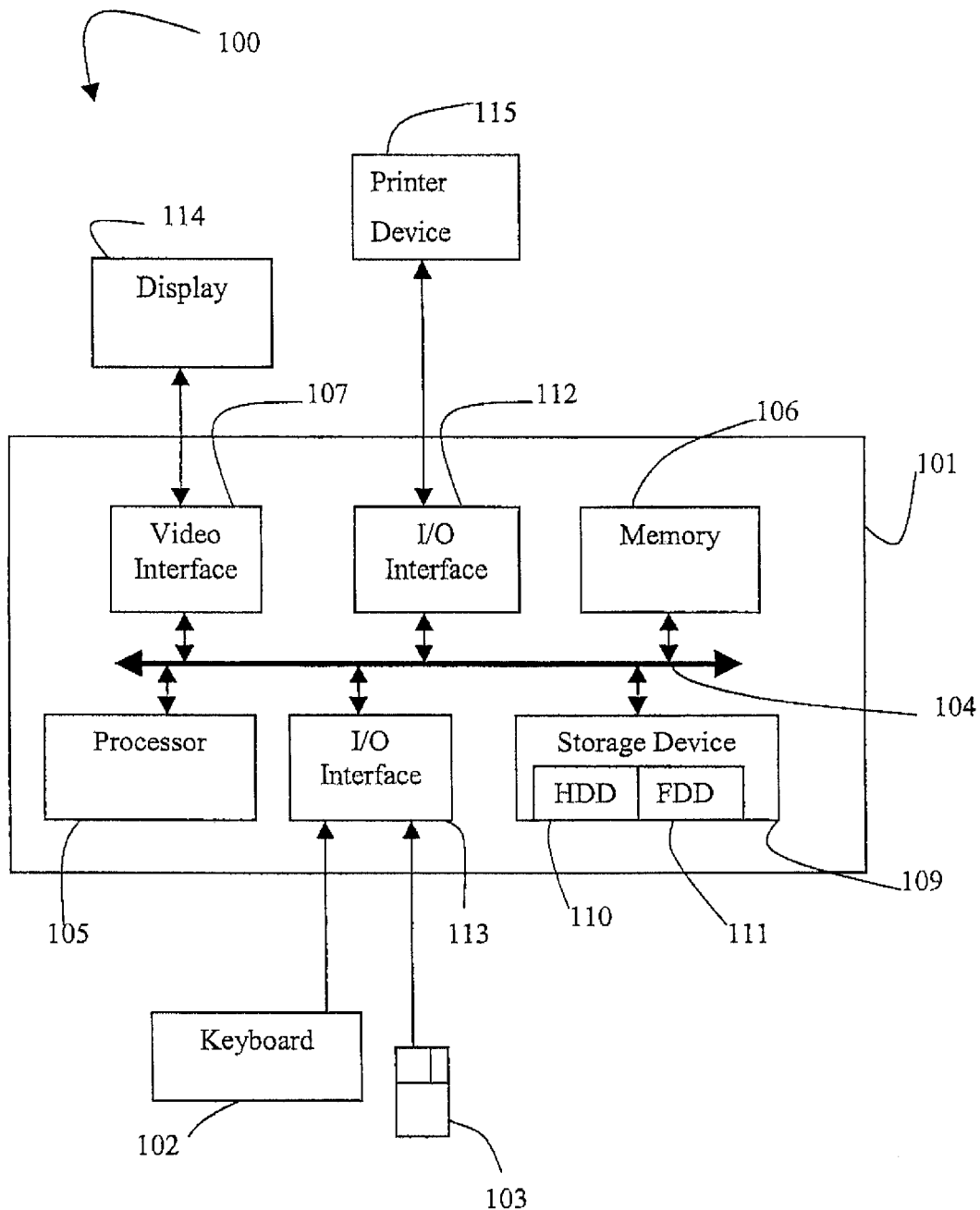
FIG. 1 is a schematic block diagram of a conventional general-purpose computer system upon which the embodiment of the invention may be practised.

A general-purpose computer system 100 upon which the preferred embodiment of the invention may be practised, is shown in FIG. 1. The computer system 100 will first be described, followed more particularly by a description of a method of checking of correctness and consistency of units and dimensions of variables and constants, used in expressions.

This method may be implemented as software, such as an application program executing within the computer system 100. In particular, the steps of method of checking of correctness and consistency of units and dimensions of variables and constants, used in expressions, are effected by instructions in the software that are carried out by the computer system 100. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer preferably effects an advantageous apparatus for checking of correctness and consistency of units and dimensions of variables and constants, used in expressions, in accordance with the embodiments of the invention.

The computer system 100 comprises a computer module 101, input devices such as a keyboard 102 and mouse 103, and output devices including a printer 115 and a display device 114. The computer module 101 typically includes at least one processor unit 105, a memory unit 106, for example formed from semiconductor random access memory (RAM) and read only memory (ROM), input/output (I/O) interfaces including a video interface 107, an I/O interface 112 for the printer device 115 and an I/O interface 113 for the keyboard 102 and mouse 103. A storage device 109 is provided and typically includes a hard disk drive 110 and a floppy disk drive 111. A CD-ROM drive (not illustrated) may be provided as a non-volatile source of data. The components 105 to 113 of the computer module 101, typically communicate via an interconnected bus 104 and in a manner which results in a conventional mode of operation of the computer system 100 known to those in the relevant art.

Typically, the application program of the preferred embodiment is resident on the hard disk drive 110, and read and controlled in its execution by the processor 105. Intermediate storage of the program may be accomplished using the semiconductor memory 106, possibly in concert with the hard disk drive 110. In some instances, the application program may be supplied to the user encoded on a CD-ROM or floppy disk and read via a CD-ROM drive (not illustrated) or floppy disk drive 111, or alternatively may be read by the user from the network (not illustrated) via the modem device (not illustrated). Still further, the software can also be loaded into the computer system 100 from other computer readable medium including magnetic tape, a ROM or integrated circuit, a magneto-optical disk, a radio or infra-red transmission channel between the computer module 101 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

Having described the hardware environment of the invention, the method of checking of correctness and consistency of units and dimensions of variables and constants, such as is used in a computer program, will now be described.

Precompiler Directives

In the preferred embodiment of the invention the method is performed using a set of user-supplied precompiler directives. The precompiler directives are added to the computer program that is to be checked, where they can be detected and processed by a precompiler tool. The precompiler tool of the preferred embodiment is executed before the compilation of the computer program.

The precompiler directives are preferably introduced as specially formatted comments into the computer program, recognisable by the precompiler tool. This allows even existing computer programs, with little or no modification, to make use of the precompiler tool. The only modification required to be made in the computer program is when a numerical constant has dimensions or units. In such cases, the constants are replaced with appropriately assigned variable names. For example, all occurrences of a constant 2.5 with dimensions, say, m/sec, may be replaced by a variable c1, where the variable name c1 does not conflict with other variable names in the program, c1 is assigned the value 2.5 before its first use, and a precompiler directive is introduced for the variable c1.

C and C++ programing language conventions will be used to illustrate the formatting procedure for the precompiler directives. The formatting procedure may be modified to suit computer programs written in these or other programming languages and/or the preferences of the precompiler tool designer.

There are three forms of precompiler directives, namely those for variables, for functions, and for function parameters. Firstly, the precompiler directive of a variable var_ name used in the computer program takes a syntactical form as follows:

---
//$ var_name units_strg
--- where //$ indicates that this comment is a precompiler directive and units_strg is a character string which contains the units of the variable var_name. For example, if the variable var_name has units m²/sec, then its units_strg is "m*m/sec". If the variable var_name does not have any units, then its units_strgis the null string: "".

For each program variable used in the computer program, a precompiler directive must appear somewhere within the scope of the variable in the computer program, but prior to the variable's first use within its scope. It is preferable to group the precompiler directives of variables of like scope at the beginning of the scope for ease of readability and comprehension. As is common in computer programing, blanks separate the elements //$, var_name, and units_strg within the precompiler directive. It is therefore evident that the precompiler directive elements themselves cannot have any blanks embedded within them.

Secondly, the precompiler directive of a function func_name( ) used in the computer program takes a syntactical form as follows:

---
//$ func_name(type-list) units_strg
--- where type-list lists parameter types. The parameter types are listed in the same sequence as they appear in the function's declaration so that the specific instance of the function func_name( ) being invoked, can be identified without ambiguity when the same function func_name( ) has been used with different sets of parameters, as is permitted by some modern programming languages, such as C++. The type_list can be formatted as a character string without any embedded blanks, and each parameter type is separated from the next by a comma.

For example, for a function
velocity(float distance, float time)
the type_list is represented by the string "float,float". Again, blanks separate the elements //$, func_name(type-list), and units_strg within the precompiler directive. It is therefore again evident that the precompiler directive elements themselves cannot have any blanks embedded within them.

As is the case with precompiler directive for variables, the precompiler directive for functions must also be placed within their respective scopes in the computer program and prior to their use within the scope.

Finally, for each function func_name, its parameters par1, par2, . . . , parn also need precompiler directives. The precompiler directives of the parameters par1, par2, . . . , parn take syntactical forms as follows:

---
//$ func_name(type-list) .par1 units_strg
//$ func_name(type-list) .par2 units_strg
. . .   . . .   . . .
//$ func_name(type-list) .parn units_strg
--- where func_name (type-list).pari, with i=1, 2, . . . ,n refers to the i-th parameter of the function func_name( ). The precompiler directives for the function parameters are pref- erably placed immediately after the precompiler directives of their respective function's precompiler directives, but always must be placed within their respective function's scope in the computer program and prior to their first use within the scope.

Reduced Expression

A unit expression of an algebraic expression is the result of replacing each variable and constant in the algebraic expression by its respective units. Thus the algebraic expression x+y*z, where the units of x, y, z are, respectively, kg, sec, m, has the unit expression kg+sec*m. In this invention, the basic units, such as kg, sec, etc. are treated as variable names. Therefore, a unit expression is also an algebraic expression, wherein the only permitted variable names are the names of predefined basic units.

To facilitate comparisons between two expressions, the concept of a reduced expression, as describe below, has been used. The reduced expression is the canonical form to which expressions are converted. It is apriori assumed that the expression to be converted is syntactically correct and does not contain any blanks. In the preferred embodiment, units (or variable names) are limited in their construction to lower-case alphabets, underscore character, and digits, except that a unit (or a variable name) may not start with a digit or end with an underscore. If these construction rules are not met, then the affected units (or variable names) may be mapped (aliased) to alternative, but distinct, names obeying the construction rules, and these new names used instead.

To convert a given unit expression into a reduced expression, the unit expression firstly is put in the following form:

<unitary operator><operand><operator><operand> . . . <operator><operand> where the unitary operator is either +(plus) or −(minus), and each operator is one of +(plus), −(minus), * (multiplication) or / (division). In the event that a unit-expression does not commence with a unitary operator, a unitary operator +(plus) is inserted at the start of the unit expression. For example:

m*kg/sec becomes +m*kg/sec

Note, in particular, the absence of brackets. Brackets, if present, in the unit expression must be removed by carrying out the necessary operations needed to remove them, such as multiplying two parenthesized factors, discarding superfluous brackets, etc. to bring a given unit expression into the above form.

Next, the operator-operand pair, /x, is handled as follows:
Division by a unit (eg /sec) is replaced by multiplication by the reciprocal of the unit, where the reciprocal of the unit is formed by adding a underscore to the unit (eg. *sec_).
Division by a constant (eg /5) is replaced by multiplication by the reciprocal of the constant (eg *0.2).

Next, all +(plus) operators are substituted with the string +1* so that + becomes +1*. Similarly, all −(minus) operators are substituted with the string −1* so that − becomes −1*. Thus, for example:

+m becomes +1*m
and
−kg*m becomes −1*kg*m

Finally, the operands, which are constants (including the '1's introduced in the previous step) are converted into an e-format as follows:

".[unsigned number]e[e-sign][unsigned exponent]"
where: [unsigned number] is a n-digited number comprising only digits and n is a prefixed integer greater than 0;

[e-sign] is the sign of the exponent and is one of > for plus or < for minus; and

[unsigned exponent] is a m-digited number comprising only digits and m is a prefixed integer greater than 0. Thus, for example:

$25=0.25*10^2$ becomes 0.250000e>02 and $0.025=0.25*10^{-1}$ becomes 0.250000e<01 where it is assumed n=6 and m=2. It is noted that any constant will be represented by a string of constant length m+n+3 characters in the e-format. Here e[e-sign][unsigned exponent] represents the quantity 10 raised to the power [e-sign][unsigned exponent], which must be multiplied to the number represented by [unsigned number] to get the actual constant.

Now, the expression is free of the division operator and will contain at least one operand which is a constant. Each term in this expression will therefore have the following form:

<unitary operator><operand><*><operand> . . . <*><operand> where the unitary operator is either +(plus) or −(minus), and between two consecutive operands is the multiplication operator *. After the terms are identified, the [e-sign] of each constant is restored from < or > to − or + respectively.

In each term the operands are sorted (rearranged) in ascending order according to their ASCII (American Standard Code for Information Interchange) value. This does not affect the term since the multiplication operator is a commutative operator, so the exchange of operands is completely permissible. It is noted that no other unit will be able to place itself in the rearrangement between a unit "a" and its reciprocal "a__", if the unit "a" and its reciprocal "a__" both are present in the list of operands to be sorted. Operator-operand sequences of the form "*a*a__" are eliminated from the term. (An expression, such as, $a^3/a^2$ will appear as "*a*a*a*a__*a__". After "*a*a__" has been eliminated from it, "*a*a*a__" will remain, from which "*a*a__" must, again, be eliminated. That is, the elimination process must be continued till no further elimination is possible.) The is operands, which are constants, will all bunch up at the beginning of the terms where they can be easily identified and replaced by a single constant. Thus, for example:

+0.100000e+01*sec*kg*m*sec__*0.500000e+00 after arranging the operands in ascending order becomes

+0.100000e+01* 0.500000e+00*kg*m*sec*sec__ and after consolidating the constants and eliminating the units sec and sec__ the term becomes +0.500000e+00*kg*m At this stage a term will have the following form:

<unitary operator><constant><*><operand>. . . <*><operand> where each operand is a unit (or a variable name), whose ASCII value is not lower than that of its preceding operand, if any. This is the reduced form of a term. In the reduced form, the non-constant part of a term is called a unit-group. For example, if the term in the reduced form is "+0.250000e+01*m*m*sec", then its unit-group is "*m*m*sec".

In an expression, all those terms whose unit-groups match, are combined by modifying the constant in one of the terms, and eliminating all other terms with identical unit-group.

Finally, the reduced terms in the expression are rearranged in an ascending order according to the ASCII value of their respective unit-group. In this final form, the expression is said to be in its reduced form. Note, in particular, that no two terms in a reduced expression will have the same unit-group. Further, in this embodiment, if the reduced expression has the value 0, it is represented by the special string "0.0", called a zero string.

Method

Figure 2A:
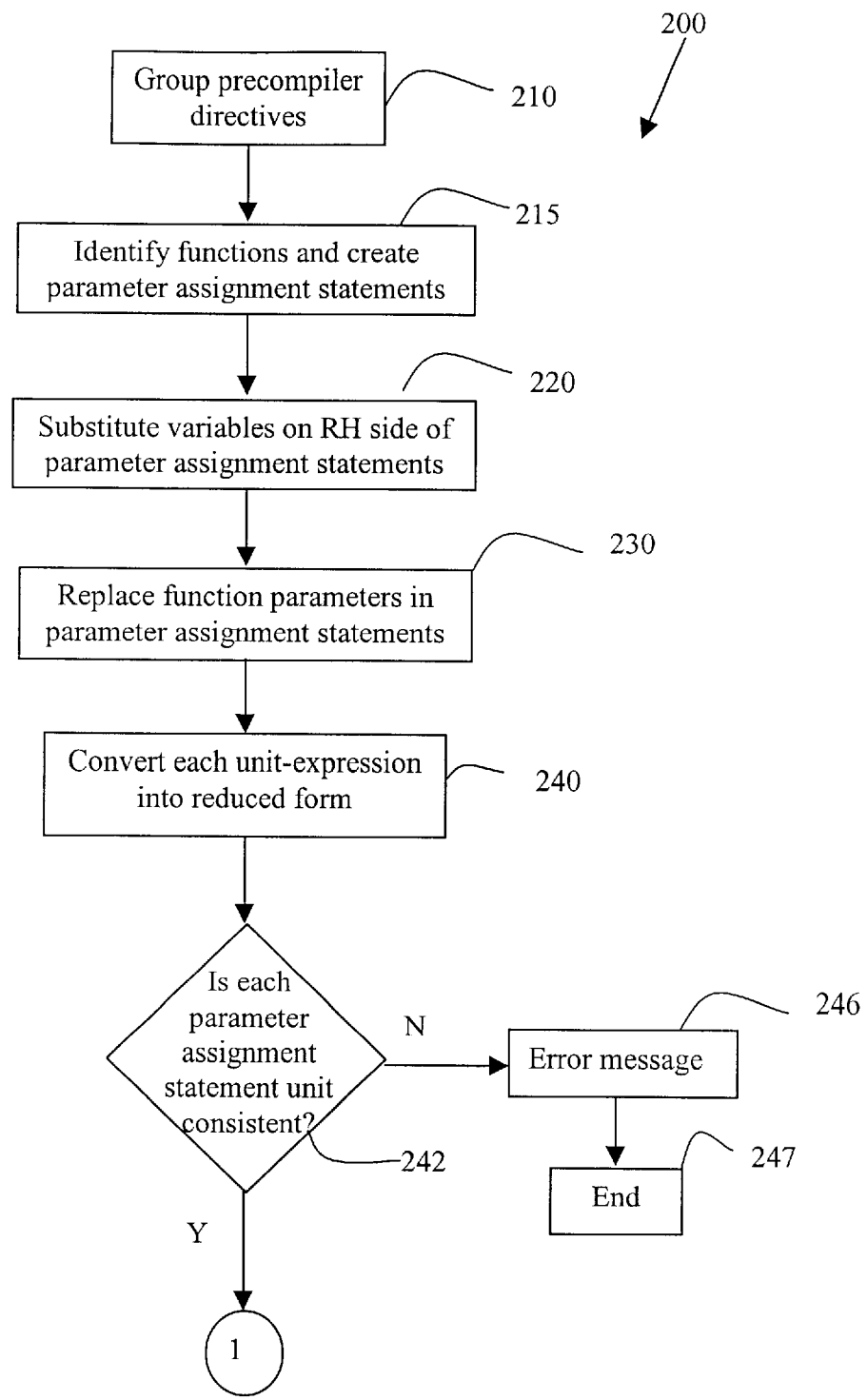
FIGS. 2A and 2B show a flow diagram of a method of checking units and dimensional homogeneity of expressions.
Figure 2B:
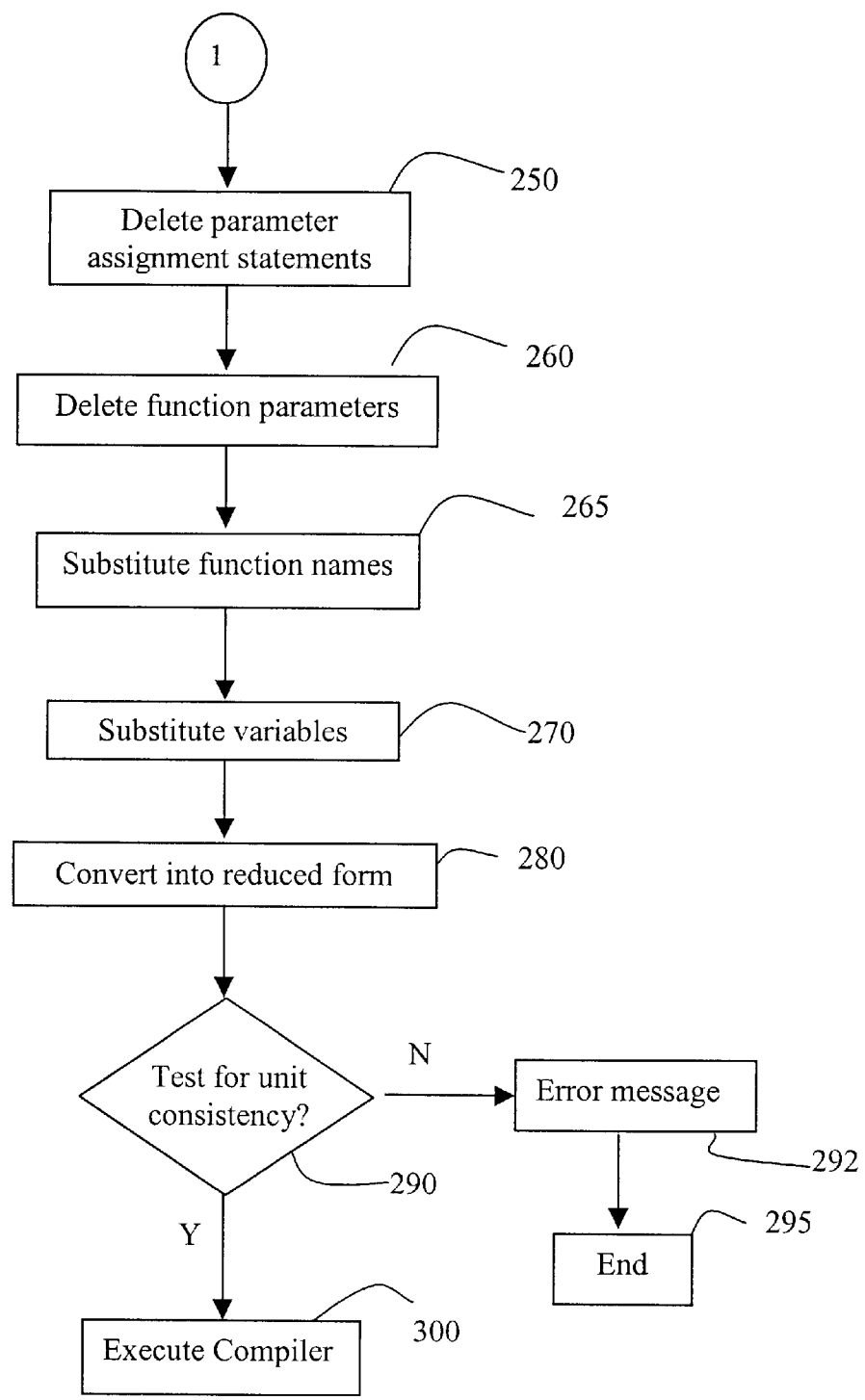

Referring to FIGS. 2A and 2B, a flow diagram is shown of a method 200, performed by the precompiler tool, of determining whether the units and dimensions of variables and constants are correct. Referring to FIG. 2A and starting at step 210, the precompiler tool scans the computer program, statement by statement, and groups the precompiler directives according to their scope and place the groups of precompiler directives at the beginning of their respective scopes.

Step 215 identifies each instance of the function func__name( ) and creates parameter assignment statements for each parameter par1, par2, . . . , parn of the function func__name, as shown by the following example:

A function Myfunction(x+y, y*y, x−z), has precompiler directives as follows:

| | |
|---|---|
| //$ Myfunction(int, int, int) | m |
| //$ Myfunction(int, int, int) .par1 | 1/sec |
| //$ Myfunction(int, int, int) .par2 | m/sec |
| //$ Myfunction(int, int, int) .par3 | m |

Step 215 then creates the following parameter assignment statements:

Myfunction(int,int,int).par1=x+y;

Myfunction(int,int,int).par2=y*y;

Myfunction(int,int,int).par3=x−z;

Step 220 substitutes instances of the variables on the right hand side of parameter assignment statements with their corresponding string units__strg, enclosing it within brackets. For example, if the variable x has the units "m/sec", then all instances of the variable x is substituted by the string "(m/sec)".

Step 230 follows step 220 by replacing each parameter func__name (type-list) .pari on the left hand sides of the parameter assignment statements with their corresponding string units__strg, enclosing it within brackets.

Each side of each of the transformed parameter assignment statements is now seen to be a unit-expression. Step 240 converts each unit-expression in the parameter assignment statements into its corresponding reduced expression.

Because no two terms in a reduced expression will have an identical sequence of <*><operand> pairs or unit-group, the characteristic of the reduced form is that, no matter what the expression, it will only reduce to either a single term or a "0.0" string, if its units are consistent. Therefore, step 242 checks each parameter assignment statement for consistency of units by firstly determining whether each unit-expression has reduced to either a single term or a "0.0" string, and secondly, by determining whether the right hand side and left hand side of each parameter assignment statement have the same unit-group.

If any one of the parameter assignment statements is not unit consistent, the method 200 continues to step 246 where it produces an error message listing the function parameter(s) func__name (type-list).pari which failed the consistency test. The method 200 then terminates in step 247.

However, if all the parameter assignment statements are determined to be unit consistent, then step 250 deletes all the parameter assignment statements. Step 260 follows step 250 by, within the scope of each function func_name(par1, par2, . . . , parn) and for each instance of the function func_name( ) (identified on the basis of its parameters' type_list), deleting the function's parameters par1, par2 , . . . , parn. Step 265 then substitutes the function name func_name along with its following brackets string "( )" with its corresponding string units_strg, enclosing it within brackets. For example, for the following three functions:

```
func(float x);
func(complex x); and
func(float x, float y),
``` having the same function name func, and their respective return values have units kg, m, and kg/m respectively, then their respective precompiler directives, added to the computer program, would be:

| //$ func(float) | kg |
| //$ func(complex) | m |
| //$ func(float,float) | kg/m |

Suppose an example statement in the computer program has a fragment including v*func(x,y), then steps 260 and 265 would make the function func(x,y) undergo the following transformations:

func(x,y) would be identified by step 260 as the function func(float,float). It would then delete the function parameters float,float, thereby changing it to func( ). Finally, step 265 would replace func( ) with its corresponding units character string unit_strg namely (kg/m), so that the statement fragment v*func(x,y), after the execution of steps 260 and 265, would appear as v*(kg/m).

Step 270 follows step 265 by, within the scope of each of the variables, substituting instances of the variables with their corresponding string units_strg, enclosing it within brackets.

Step 280 converts each expression, in assignment statements and logical statements within the computer program into the standard or reduced form. Step 290 then checks for unit-consistency. The conditions for unit-consistency are:

Expressions. An expression is said to have consistent units (is unit-consistent) if its unit-expression reduces either to a single term or to the string "0.0".

Assignment statements. If the right hand side expression of an assignment statement is unit-consistent, and further, both sides of the assignment statement have the same unit-group, then the statement is balanced in terms of units.

Logical statements. If the expressions on either side of the logical operator (such as ==, !=, >=, etc) are unit consistent, and further, both sides of the operator have the same unit-group, then the logical statement is balanced in terms of units.

If the determination in step 290 is positive, then the method continues to step 300 where the computer program is compiled. Alternatively, the method terminates in step 295 after producing an appropriate error message in step 292, indicating that an expression is not unit consistent.

The method 200 can similarly be implemented to test for consistency of dimensions. Effectively, method 200 has replaced a variable or a function by a grouping consisting of units such as kg, m, sec, written as an expression. In a dimensional analysis, the variable or ftmction is replaced by a grouping of, say, mass (M), length (L), time (t), temperature (T), etc. Thus, if a variable v has dimensions mass×(length)$^2$/time, then for performing a dimensional check, the precompiler directive for the variable v may be formatted as:

| //$ v M*L*L/t |

To meet the requirement of the present embodiment, where variable names are precluded from having upper case letters, the variables M, L and T may be replaced, by say, mass, len and temp respectively as alternative names.

EXAMPLE 1

In example 1, the consistency of units in an expression a*x/y+b*c/d are determined by using the method 200. The units of the variables a, b, c, d, x, and y, are m, m, kg, sec, kg, and sea respectively.

In the computer program, the following precompiler directives for each of the variables are added:

| //$ a m |
| //$ b m |
| //$ c kg |
| //$ d sec |
| //$ x kg |
| //$ y sec |

Then, starting at step 210 of method 200, the precompiler tool groups these precompiler directives together. Performing steps 215 to 265 has no effect since the expression a*x/y+b*c/d does not contain any functions.

Step 270 substitutes instances of each variable with its corresponding unit string units_strg, enclosing it within brackets. The following unit-expression is thus created:

(m)*(kg)/(sec)+(m)*(kg)/(sec)

Step 280 follows by converting the unit-expression into a reduced form. The reduced unit-expression for this becomes:

+0.200000e+01*kg*m*sec_ which is determined by step 290 to have a single term. Hence the expression a*x/y+b*c/d has been determined to have consistent units. The unit-group in the term is the string "*kg*m*sec_", which is obtained after skipping the constant +0.200000e+01.

On the other hand, had the expression been a*x/y−b*c/d the result would have been the unit-expression "0.0", which again would imply that the expression has consistent units.

As a further variation of Example 1, where, due to a typographical error, /d in expression a*x/y+b*c/d has been typed as *d, resulting in the expression:

a*x/y+b*c*d

In this case, after performing step 270, the unit-expression would be (m)*(kg)/(sec)+(m)*(kg)*(sec)

Performing step 280, the reduced unit-expression for this becomes

+0.100000e+01*kg*m*sec_+0.100000e+01*kg*m*sec which is a two-term unit-expression. Step 290 thus determines that the expression a*x/y+b*c*d has inconsistent units, even though it is syntactically correct.

Considering yet another variation with expression a*x/y+b*c/d, where the unit of variable b is given as "cm" instead of "m". In this case step 280 determines the reduced unit-expression as:

+0.100000e+01*cm*kg*sec+0.100000e+10*kg*m*sec__ which is again a two-term unit-expression, indicating that the expression a*x/y+b*c/d, although syntactically correct, has inconsistent units.

EXAMPLE 2

In this example, the consistency of units in a function:

Myfunction(x+y, y, x−z)

is determined. The function and function parameters precompiler directives are as follows:

| //$ x | m | | |
|---|---|---|---|
| //$ y | m | | |
| //$ z | sec | | |
| //$ Myfunction( ) | .par1 | m | |
| //$ Myfunction( ) | .par2 | m | |
| //$ Myfunction( ) | .par3 | m | |

Step 215 creates the following parameter assignment statements for the function Myfunction( ):

| Myfunction( ) .par1 = x+y; |
|---|
| Myfunction( ) .par2 = y; |
| Myfunction( ) .par3 = x−z; |

Step 220 substitutes instances of the variables x, y and z on the right hand side of the parameter assignment statements with their corresponding string unit__strg and step 230 replaces the function parameters Myfunction( ).pari on the left hand sides of the parameter assignment statements with their corresponding string unit__strg to provide the following unit-expressions:

| (m) = (m) + (m) ; |
|---|
| (m) = (m) ; |
| (m) = (m) − (sec) ; |

Step 240 converts each of the unit-expressions into their reduced forms as follows:

| +.100000e+01*m = | +.200000e+01*m; |
|---|---|
| +.100000e+01*m = | +.100000e+01*m; |
| +.100000e+01*m = | +.100000e+01*m−.100000e+01*sec; |

Testing the parameter assignment statements for unit consistency in step 242, it is determined that only the first two parameter assignment statements have single terms on both the left and right hand sides. Furthermore, the first two parameter assignment statements have the same unit-groups on their respective left hand sides and the right hand sides. Therefore, the first two parameters of the function Myfunction(x+y,y,x−z) are unit-consistent. However, for the third assignment statement, the unit-expression on the right hand side has not reduced to a single term, and the third parameter of the function Myfunction(x+y,y,x−z) has therefore inconsistent units. A function call Myfunction(x+y,y,x−z), if made by a computer program, would have an incorrect result.

EXAMPLE 3

Next, the method 200 is performed on the following assignment statement:

z=b*c/d+f(a, 3.0*b/c)

where the function f( ) has two parameters namely a and 3.0*b/c. The units of variables a, b, c, d and z, as well as function f( ), are shown in the following precompiler directives:

| //$ a | m |
|---|---|
| //$ b | m |
| //$ c | kg |
| //$ d | sec |
| //$ f(int,int) | kg*m/sec |
| //$ f(int,int) .par1 | m |
| //$ f(int,int) .par2 | m/kg |
| //$ z | kg*m/sec |

Performing step 215, the precompiler tool identifies f(a, 3.0*b/c) as a function within the assignment statement. It therefore creates the following parameter assignment statements for the function f( ):

| f(int,int) .par1 = a; |
|---|
| f(int,int) .par2 = 3.0*b/c; |

Step 220 substitutes instances of the variables on the right hand side of the parameter assignment statements with their corresponding string units__strg, enclosing it within brackets, followed by step 230 which replaces each of the parameters f(int,int).pari on the left hand side of the parameter assignment statements with their corresponding string units__strg, also enclosing it within brackets, resulting in the following two parameter assignment statements:

| (m) = (m) |
|---|
| (m/kg) = 3.0* (m) / (kg) |

Step 240 reduces the parameter assignment statements to the following:

| +.100000e+01*m = +.100000e+01*m; |
|---|
| +.100000e+01*kg__*m = +.300000e+01*kg__*m; |

Step 242 determines that the respective sides of the assignment statements each has a single term. Secondly, since the respective right hand sides and left hand sides of the two parameter assignment statements have the same unit-group, the function f(a, 3.0*b/c) is determined to be unit-consistent.

The method 200 therefore continues to step 250 where all the parameter assignment statements are deleted. Step 260 deletes the function parameters and step 265 substitutes the function name f( ) with its corresponding string namely kg*m/sec. Step 270 then substitutes instances of the variables in the assignment statement with their corresponding string units__strg, enclosing it within brackets. The assignment statement is now in the following form:

(kg*m/sec)=(m)*(kg)/(sec)+(kg*m/sec)

Step 280 reduces the assignment statement to the following:

+0.100000e+01*kg*m*sec+0.200000e+01*kg*m*sec_

Step 290 tests for unit consistency of the assignment statement. It is firstly noted that the right hand side of the assignment statement has a single term and therefore is unit-consistent. Secondly, since the right hand side is unit consistent, and both sides have the same unit-group, the given assignment statement is unit-consistent.

The method 200 therefore continues to step 300 where compilation of the program can continue.

Embodiments of the invention can be implemented within compilers, for example. As is well known, a compiler generates machine executable object code from high-level source code, written in languages such as C++ and Java™.

The foregoing describes only one embodiment of the present invention, and modifications and/or changes can be made thereto without departing from the scope and spirit of the invention, the embodiments being illustrative and not restrictive.

I claim:

1. A method of checking a computer program for unit or dimensional homogeneity, said computer program including expressions, and said method comprising the steps of:

accepting as input corresponding strings for variables used in said expressions;

identifying and substituting instances of said variables with said corresponding strings;

recasting said expressions into a form of one or more token pairs arranged sequentially in a string, each said token pair comprising an operator followed by an operand;

reducing said strings in accordance with a set of predetermined simplifying rules; and checking said reduced strings for unit or dimensional homogeneity in accordance with a set of predetermined conditions.

2. The method according to claim 1, whereby said computer program further includes assignment statements and the right hand sides of said assignment statements constitute expressions.

3. The method according to claim 1, in which said computer program includes functions, and said method comprises the further steps of checking for unit or dimensional homogeneity of said functions by:

accepting as input corresponding strings for said functions and function parameters used in said expressions;

creating an assignment statement for each of said function parameters;

identifying and substituting instances of variables on right hand side of said assignment statements with said corresponding strings;

substituting said function parameters with said corresponding strings;

recasting sides of said assignment statements into said form of one or more token pairs arranged sequentially in a string;

reducing said strings in accordance with said set of predetermined simplifying rules; and checking said reduced strings for unit or dimensional homogeneity in accordance with said set of predetermined conditions.

4. The method according to claim 1, whereby said simplifying rules comprise performing the steps of:

arranging token pairs into subgroups;

arranging operand tokens in an arranged subgroup in order;

reducing the ordered operands by consolidating one or more constants and eliminating variables of opposite effect to form reduced subgroups; and consolidating one or more multiple instances of similar subgroups, to produce a reduced string.

5. The method according to claim 1, whereby said set of predetermined conditions for expressions comprise performing the step of:

testing whether said reduced string reduces to a single term; or testing whether said reduced string reduces to the zero string.

6. The method according to claim 2, whereby said set of predetermined conditions for assignment statements comprise performing the steps of:

testing whether said reduced string reduces to a single term; or testing whether said reduced string reduces to the zero string; and testing by comparison whether said sides of said assignment statements have corresponding unit-groups.

7. Apparatus for checking a computer program for unit or dimensional homogeneity, said computer program including expressions, said apparatus comprising:

means for accepting as input corresponding strings for variables used in said expressions;

means for identifying and substituting instances of said variables with said corresponding strings;

means for recasting said expressions into a form of one or more token pairs arranged sequentially in a string, each said token pair comprising an operator followed by an operand;

means for reducing said strings in accordance with a set of predetermined simplifying rules; and means for checking said reduced strings for unit or dimensional homogeneity in accordance with a set of predetermined conditions.

8. The apparatus according to claim 7, wherein said computer program further includes assignment statements and the right hand sides of said assignment statements constitute expressions.

9. The apparatus according to claim 7, wherein said computer program includes functions, said apparatus comprising further means for checking for unit or dimensional homogeneity of said functions, said further means comprising:

means for accepting as input corresponding strings for said functions and function parameters used in said expressions;

means for creating an assignment statement for each of said function parameters;

means for identifying and substituting instances of variables on right hand side of said assignment statements with said corresponding strings;

means for substituting said function parameters with said corresponding strings;

means for recasting sides of said assignment statements into said form of one or more token pairs arranged sequentially in a string;

means for reducing said strings in accordance with said set of predetermined simplifying rules; and means for checking said reduced strings for unit or dimensional homogeneity in accordance with said set of predetermined conditions.

* * * * *